(12) United States Patent
Reiman et al.

(10) Patent No.: US 7,604,284 B2
(45) Date of Patent: Oct. 20, 2009

(54) VEHICLE FAIRING STRUCTURE

(75) Inventors: James Reiman, Winnetka, IL (US); Peter Heppel, Courceroy (FR)

(73) Assignee: Aerofficient, LLC, Winnetka, IL (US)

( * ) Notice: Subject to any disclaimer, the term of this patent is extended or adjusted under 35 U.S.C. 154(b) by 0 days.

(21) Appl. No.: 11/684,097

(22) Filed: Mar. 9, 2007

(65) Prior Publication Data
US 2008/0061597 A1  Mar. 13, 2008

Related U.S. Application Data

(60) Provisional application No. 60/844,511, filed on Sep. 13, 2006, provisional application No. 60/844,442, filed on Sep. 13, 2006.

(51) Int. Cl.
*B62D 35/00* (2006.01)
(52) U.S. Cl. .................. 296/180.4; 296/180.1
(58) Field of Classification Search .............. 296/180.1, 296/180.2, 180.4, 181.5, 186.1; 180/903; 105/1.1
See application file for complete search history.

(56) References Cited

U.S. PATENT DOCUMENTS

| | | | | |
|---|---|---|---|---|
| 2,101,793 A | | 12/1937 | Field, Jr. | |
| 3,415,566 A | * | 12/1968 | Kerrigan | 296/180.4 |
| 3,711,146 A | | 1/1973 | Madzsar et al. | |
| 3,834,752 A | | 9/1974 | Cook et al. | |
| 3,934,922 A | * | 1/1976 | MacCready et al. | 296/180.4 |
| 4,022,508 A | * | 5/1977 | Kirsch et al. | 296/180.4 |
| 4,036,519 A | | 7/1977 | Servais et al. | |
| 4,057,280 A | * | 11/1977 | MacCready et al. | 296/180.4 |
| 4,113,299 A | * | 9/1978 | Johnson et al. | 296/180.4 |
| 4,142,755 A | | 3/1979 | Keedy | |
| 4,156,543 A | | 5/1979 | Taylor et al. | |
| 4,311,334 A | * | 1/1982 | Jenkins | 296/180.4 |
| 4,316,630 A | * | 2/1982 | Evans | 296/180.2 |
| 4,360,232 A | * | 11/1982 | Elder | 296/180.4 |
| 4,401,338 A | * | 8/1983 | Caldwell | 296/180.2 |
| 4,457,550 A | * | 7/1984 | Gielow et al. | 296/180.4 |
| 4,518,188 A | | 5/1985 | Witten | |
| 4,553,782 A | | 11/1985 | Markland | |
| 4,601,508 A | * | 7/1986 | Kerian | 296/180.4 |
| 4,611,847 A | | 9/1986 | Sullivan | |
| 4,682,808 A | | 7/1987 | Bilanin | |
| 4,688,841 A | | 8/1987 | Moore | |
| 4,693,506 A | | 9/1987 | Massengill | |
| 4,702,509 A | * | 10/1987 | Elliott, Sr. | 296/180.4 |
| 4,746,160 A | | 5/1988 | Wiesemeyer | |
| 4,779,915 A | | 10/1988 | Straight | |
| 4,824,165 A | | 4/1989 | Fry | |
| 4,904,015 A | | 2/1990 | Haines | |
| 5,078,448 A | | 1/1992 | Selzer et al. | |
| 5,190,342 A | * | 3/1993 | Marlowe et al. | 296/180.2 |
| 5,280,990 A | * | 1/1994 | Rinard | 296/180.1 |

(Continued)

*Primary Examiner*—Glenn Dayoan
*Assistant Examiner*—Gregory Blankenship
(74) *Attorney, Agent, or Firm*—Fitzpatrick, Cella, Harper & Scinto

(57) ABSTRACT

A vehicle fairing structure has a top fairing surface adapted to be attached to a trailer box, and first and second side fairing surfaces adapted to be attached to the sides of the trailer box, in the gap between a tractor cab and a trailer box in a tractor-trailer combination. The fairing structure directs air flow away from the gap, and is positioned in the gap to lessen aerodynamic drag, thereby reducing fuel consumption.

10 Claims, 4 Drawing Sheets

U.S. PATENT DOCUMENTS

| | | | |
|---|---|---|---|
| 5,332,280 A * | 7/1994 | DuPont et al. | 296/180.1 |
| 5,375,903 A * | 12/1994 | Lechner | 296/180.1 |
| 5,487,586 A * | 1/1996 | Kinkaide | 296/180.1 |
| 5,595,419 A | 1/1997 | Spears | |
| 5,658,038 A | 8/1997 | Griffin | |
| 5,791,724 A * | 8/1998 | Wasley | 296/180.1 |
| 6,428,084 B1 | 8/2002 | Liss | |
| 6,793,273 B1 * | 9/2004 | Tuerk | 296/186.1 |
| 6,799,791 B2 | 10/2004 | Reiman et al. | |
| 6,986,544 B2 | 1/2006 | Wood | |
| 7,008,005 B1 * | 3/2006 | Graham | 296/180.4 |
| 7,055,890 B1 * | 6/2006 | Crean | 296/180.1 |
| 7,073,845 B2 * | 7/2006 | Ortega et al. | 296/180.3 |
| 7,234,761 B1 * | 6/2007 | Crean | 296/180.4 |
| 7,318,620 B2 * | 1/2008 | Wood | 296/180.1 |
| 2003/0057736 A1 | 3/2003 | Long et al. | |
| 2004/0239146 A1 | 12/2004 | Ortega et al. | |

* cited by examiner

VEHICLE FAIRING STRUCTURE

This application claims the benefit of priority of U.S. Provisional Application No. 60/844,511 and U.S. Provisional Application No. 60/844,442, each filed Sep. 13, 2006, and which are each incorporated by reference herein.

BACKGROUND OF THE INVENTION

1. Field of the Invention

This invention relates to structures for improving the aerodynamic profile of vehicles, especially for the front end of a trailer box in a tractor-trailer combination.

2. Description of Related Art

The amount of power needed to move a vehicle over land or through the air increases with the speed of the vehicle due to aerodynamic drag. The amount of power necessary to overcome aerodynamic drag directly translates into increased fuel consumption, and thus cost of operation.

A variety of innovations aimed at reducing the aerodynamic drag of various transport vehicles, including tractor-trailer combinations, have been introduced in the prior art. These include efforts to make the hood, windscreen, fenders etc. more streamlined in form, as well as by adding fairings to the cab roof, and in some cases, to the trailer box.

U.S. Pat. No. 6,799,791 discloses a vehicle fairing structure that may be deployed on the rear of a trailer box. While this fairing structure significantly reduces drag at the rear end of the trailer box, a significant amount of drag is also associated with the front of the trailer box where there is known to be an area of high pressure and relatively stagnant air approximately at the middle of the forward vertical face of the trailer cab. In general, the present inventors believe that the aerodynamic drag arising as a result of the gap between the tractor cab and trailer increases with the size of the gap (i.e., the distance between the rear of the tractor cab or roof fairing structure and the leading edge of the trailer box).

Accordingly, fairing structures designed to direct airflow around the gap have not been completely successful. On the one hand, known fairing structures for the forward face of a trailer box can be bulky and complex, involving moving parts. They may be difficult to install or impede access to important parts of the rig. A less obtrusive fairing structure, on the other hand, may be less effective in redirecting wind and more susceptible to the negative effects of crosswind conditions. Accordingly, there continues to be a need for fairing structures that effectively and elegantly address the problem of aerodynamic drag at the leading forward face of a trailer box in a tractor-trailer combination.

A system incorporating a fairing structure according to the invention is disclosed in U.S. Provisional Application No. 60/844,442, and in a non-provisional application claiming priority thereto and filed concurrently herewith. The aforesaid patent and applications (U.S. Pat. No. 6,799,791, Provisional Application No. 60/844,442 and the non-provisional application Ser. No. 11/684,104, now U.S. Pat. No. 7,404,592 filed herewith are incorporated by reference herein.

SUMMARY OF THE INVENTION

In one aspect, the invention is a vehicle fairing structure for a vehicle having a front vehicular component and a rear vehicular component (such as a tractor-trailer). The fairing structure comprises: a top surface (sometimes referred to herein as the "horizontal surface") adapted to be attached to the roof, or the top, of the rear vehicular component, and two side surfaces (sometimes referred to herein as the "vertical surfaces") each adapted to be attached to respective sides of the rear vehicular component, joining opposite ends of the top surface and generally perpendicular to the top surface. Each of the top and side surfaces has a proximal edge adapted to be positioned adjacent the vehicle, and a distal edge adapted to be positioned away from the vehicle with respect to the respective proximal edge. The area bounded by the distal edges of the surfaces is smaller than an area bounded by the proximal edges. The fairing structure is positioned adjacent a rear vehicular component (in preferred embodiments the front of a trailer box) in a gap between the rear vehicular component and a front vehicular component (such as a tractor cab), sufficiently close to said front vehicular component to impede or otherwise lessen transverse and vertical airflow in the gap, lessening aerodynamic drag. This is accomplished by positioning the distal and proximal edges of the surfaces relative to each other such that the external faces of the fairing structure, when positioned adjacent the rear vehicular component of the vehicle in the gap, re-directs air from the rear vehicular component and also impedes or otherwise lessens vertical and transverse air flow in the gap, forming an effective closure of the gap.

In the most preferred embodiment, the vehicle fairing structure is positioned in the gap between a tractor cab and a trailer box in a tractor-trailer combination, such that the proximal edges of the top and side surfaces attach to the leading top and side edges, respectively, of the front surface of the trailer box, and the top and first and second side surfaces (collectively the "fairing surfaces") are curved so that the distal edges bound a vertical planar area inboard of the sides of the trailer box. For this purpose, although not a requirement, the fairing surfaces may be attached directly to the roof or top and front side edges of the trailer box forming an uninterrupted surface from the fairing structure to the trailer.

DETAILED DESCRIPTION OF THE PREFERRED EMBODIMENTS

While the preferred embodiment of the invention is described in connection with a tractor-trailer combination, a fairing structure according to the invention may be used with any tandem vehicle arrangement. The invention is particularly suited for use on a tandem vehicle combination having a front vehicular component and a rear vehicular component connected to the front vehicular component. In such tandem vehicle arrangements, the rear vehicular component often projects above the front vehicular component and thus causes additional aerodynamic drag of a type referred to as form drag. Also, in such tandem vehicle arrangements, the rear vehicular component is separated from the front vehicular component by a gap, which also creates aerodynamic drag. The fairing structure is preferably positioned on the front of the rear vehicular component, and addresses both of these drag-producing factors.

To describe the drag created by the gap, the near wake of a bluff backed object like a tractor cab may be described as a region of slower (or even reversed) flow, bounded by a shear layer. The shear layer is the boundary between the faster moving external flow and the slow moving air dragged along behind the cab. In the absence of cross wind, there is a general flow upwards in the gap, driven by the low pressure at the top of the gap. This tends to increase the size of a separation bubble formed on the forward end of the trailer roof, which increases drag.

Figure 4:
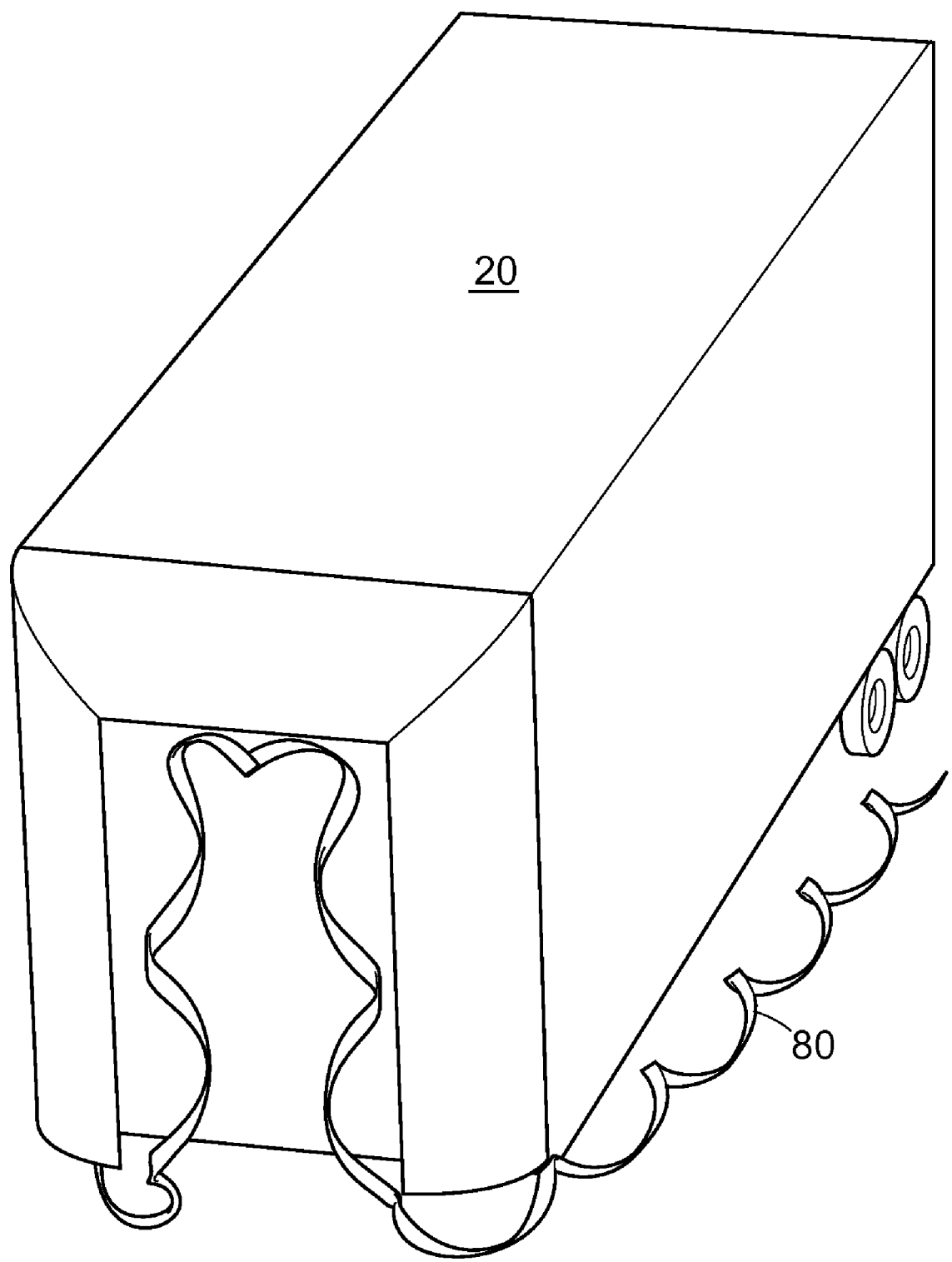
FIG. 4 shows the formation and containment of a horseshoe vortex underneath a trailer box and in the gap between the trailer box and the tractor cab.

There is also created in connection with the movement of the tractor-trailer combination a horseshoe vortex having a center extending below the trailer, as shown in FIG. 4. The horseshoe vortex is not necessarily a drag-increasing feature. However, the rotation of the vortex tails tend to pick up spray from the road wheels, throwing it up and out.

Cross wind creates a general flow from the windward to the leeward side, which is faster at the back of the gap than at the front. The flow may be sufficiently strong to sweep away the horseshoe vortex and replace it with a single vertical vortex (not shown in the Figures). Additionally, a stagnation line may form near the windward edge of the trailer's forward face, which creates a region of high pressure, and therefore drag, and also creates a vortex in the opposite sense, between the stagnation line and the bubble at the front of the trailer side, which increases drag.

In view of the foregoing general observations on the gap aerodynamics, the requirements of the fairing structure may be discussed in terms of the effect of the external face and the internal face. For the external face, a first requirement is that the distal edges should be positioned inside the volume bounded by the shear layer. In the absence of cross-wind, this simply means making the area bounded by the distal edges small enough to be generally no larger than the cab area projected rearward. However, when there is crosswind, the cab wake is displaced downwind, so that on the windward side the distal edge must be farther in, close enough to the center line that the above requirement is still met. In either case, fast moving air is prevented from impinging on the forward face of the trailer.

For the internal face, in the absence of cross-wind, the fairing tends to reduce or reverse the upwards flow, which consequently reduces the separation bubble on the trailer roof, which reduces drag and reduces the strength of the horseshoe vortex. In the presence of cross-wind, the fairing structure reduces or reverses the upward flow (as in the case of no-crosswind), but also reduces or reverses the general leeward flow, again reducing drag. The fairing structures also block air from entering the gap.

Figure 3:
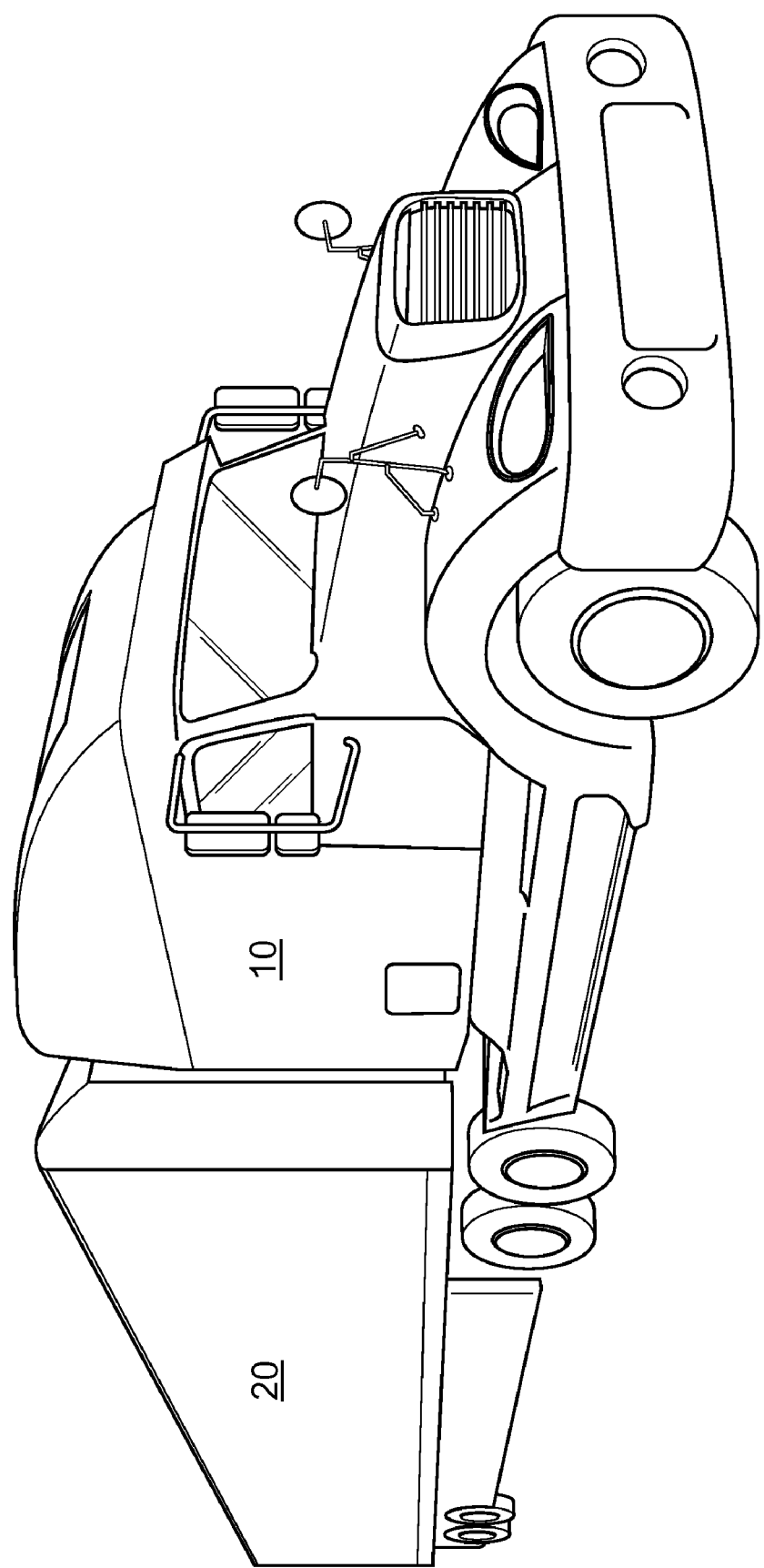
FIG. 3 is a perspective view of a tractor-trailer combination incorporating a fairing structure according to the invention.

In FIG. 3, a tractor cab 10 is the front vehicular component. Viewed head-on, the tractor cab 10 has a projection or outline. This is referred to herein as the "profile" of the tractor cab, or front vehicular component.

Figure 1:
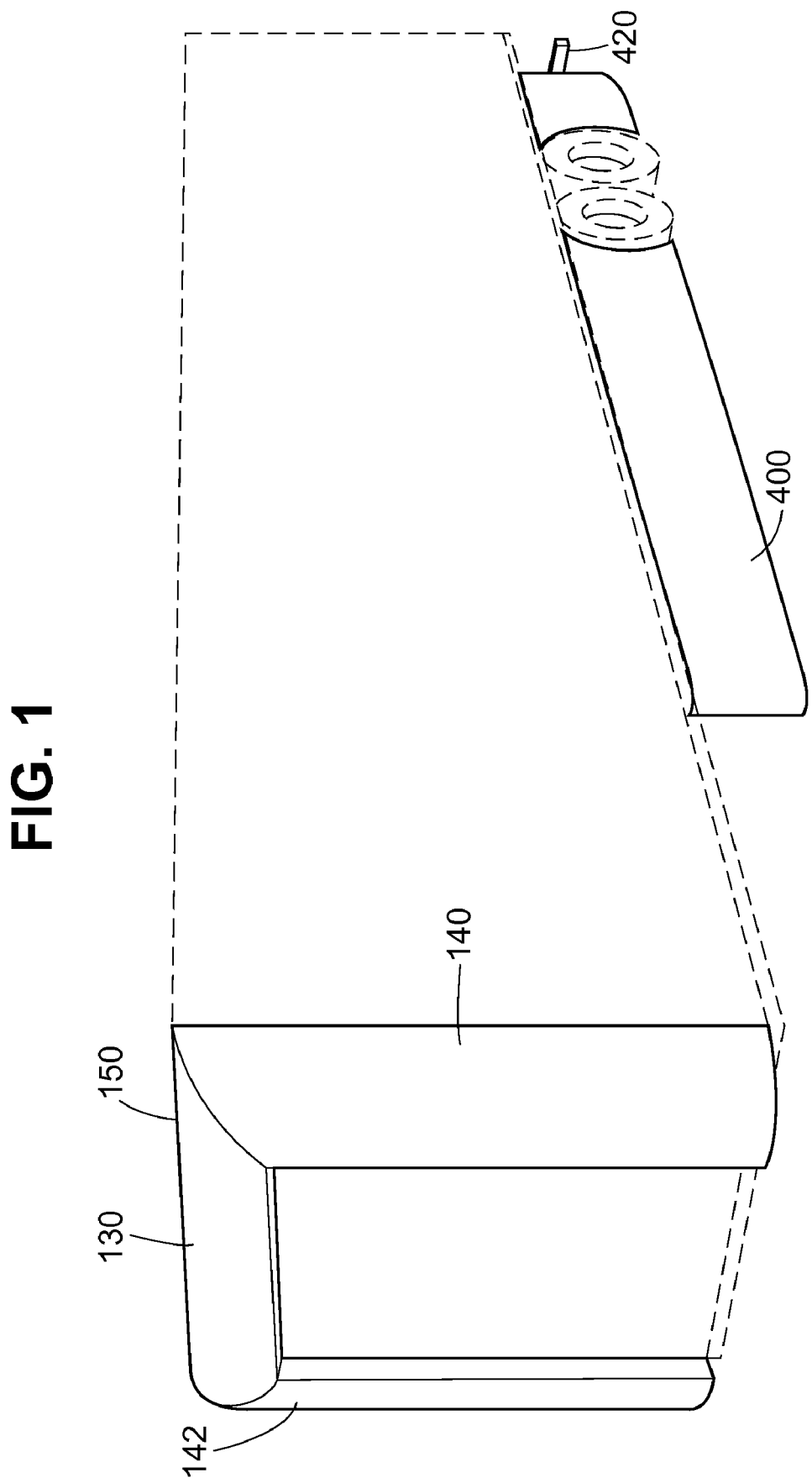
FIG. 1 is a perspective view of a trailer incorporating a front fairing on the trailer box according to the invention.
Figure 2:
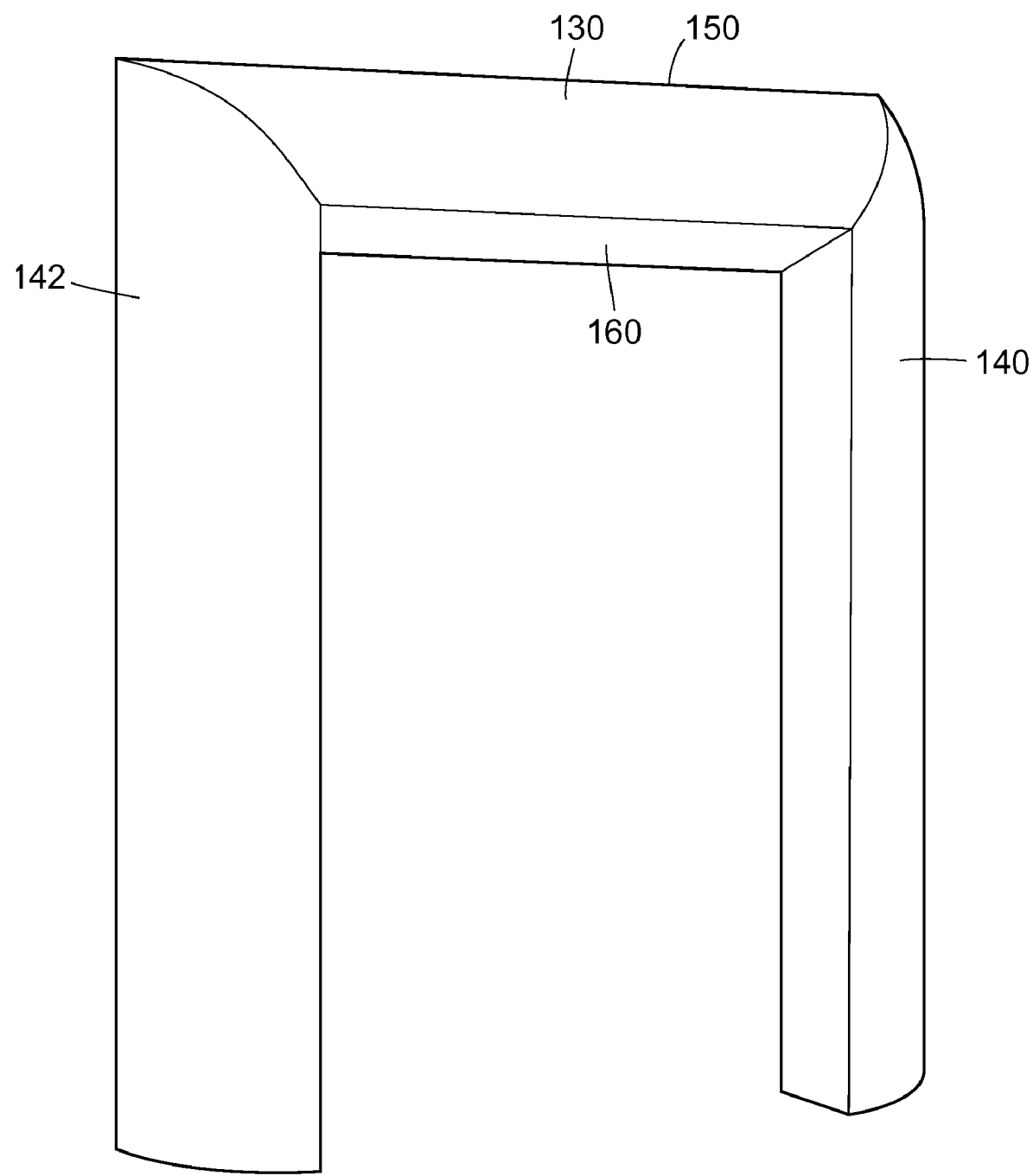
FIG. 2 is a detail of the fairing structure according to the invention.

In FIG. 2, the fairing structure comprises top horizontal surface 130 and first and second side vertical surfaces 140, 142. Each of the horizontal and first and second vertical surfaces are rigid or semi-rigid in construction. Suitable materials for these surfaces are polypropylene, fiberglass, sheet metal, and the like. These separate sheets are then joined together by appropriate mechanical elements to form a substantially continuous fairing surface.

Each of the horizontal and first and second vertical surfaces has a proximal edge adapted to be positioned adjacent a rear vehicular component 20, which is typically a trailer box in a tractor-trailer combination. Attachment may be permanent, such as by riveting, or temporary, using appropriate hardware allowing for ease of replacement or removal. If desired, the fairing structure may be riveted or otherwise directly attached to the trailer box, without hardware being needed to be attached to the forward face of the trailer box. Preferably, the boundary between the front edges 150 of the trailer box or rear vehicular component 20 and the fairing structure is continuous so that no substantial barrier to air flow is created at that point.

Optionally, support walls 160 may attach to the distal edges of the horizontal and vertical edges of the fairing surfaces and are, for example (but not necessarily), perpendicular to the leading surface of the trailer box. These support walls join with the front surface of the trailer box using the same or similar attachment hardware as may be used to attach the fairing surfaces to the edges of the trailer box.

As shown in FIG. 2, each of the horizontal and first and second vertical surfaces has a distal edge adapted to be positioned away from the rear vehicular component 20 with respect to the respective proximal edge. The fairing surfaces curve inward so that an area bounded by the distal edges of the fairing surfaces is smaller than an area bounded by the proximal edges. In a tractor-trailer, this simply means that the distal edges of the fairing structure are inboard of the trailer box. Preferably the distal edges are positioned within the volume bounded by the shear layer. In embodiments the bounded area is a substantially vertical planar area. It is also preferred that the distal edges of the fairing structure surfaces are inboard of the front vehicular component profile.

All of the foregoing features of the fairing structure surfaces are to ensure that the fairing (1) more smoothly re-directs the air stream around the portion of the rear component which projects above the front component, thereby reducing drag and (2) traps air, thereby effectively filling the gap and impeding or otherwise lessening transverse and vertical flow in the gap, and thus reducing drag.

It is believed that when the fairing structure disclosed herein is positioned between a tractor cab and trailer box, and the tractor-trailer rig is in transit, the area about the central portion of the vertical windward wall of the trailer box tends to be an area of localized high pressure which is relatively stagnant as compared to air moving around the edges of the vehicle. The radius of curvature of the fairing surfaces structure is designed to re-direct air to the sides or top of a trailer box that would otherwise become trapped in the gap between a tractor cab and the trailer box or strike the flat surface of the front of the trailer box.

What is claimed is:

1. A fairing structure for a vehicle having a front vehicular component and a rear vehicular component in tandem and separated by a gap, comprising:
   a top fairing surface adapted to be attached to the rear vehicular component;
   a first side surface adapted to be attached to a first side of the rear vehicular component, the first side surface being approximately equidistant in length to the first side of the rear vehicle component, and joining a first end of the top surface and generally perpendicular to the top surface;
   a second side surface adapted to be attached to a second side of the rear vehicular component, the second side surface being approximately equidistant in length to the second side of the rear vehicle component, and joining a second end of the top surface opposite the first end and generally perpendicular to the top surface;
   each of the top and first and second side surfaces having a proximal edge adapted to be positioned adjacent a vehicle;

each of the top and first and second side surfaces having a distal edge adapted to be positioned away from the vehicle with respect to the respective proximal edge;

wherein the proximal edges of the top and side surfaces attach to the leading top and side edges, respectively, of the front surface of the rear vehicle component so that an uninterrupted surface is formed from the fairing structure to top and sides of the rear vehicular component;

wherein an area bounded by the distal edges of the surfaces is smaller than an area bounded by the proximal edges; and wherein the distal and proximal edges of the surfaces are positioned relative to each other such that the fairing structure, when positioned adjacent the rear vehicular component of the vehicle in the gap between said rear vehicular component and the front vehicular component of the vehicle impedes outward transverse and vertical flow in the gap, thus creating a region of increased pressure which effectively fills and thereby closes the gap.

2. The vehicle fairing structure according to claim 1, wherein each of the first and second side surfaces is curved so that the distal edges of the horizontal and first and second side surfaces form a continuous line in a substantially vertical plane; and wherein the proximal edges of the top and first and second side surfaces form a continuous line in a single plane.

3. The vehicle fairing structure according to claim 1, wherein the distal edge of the top surface is below the top surface of the front vehicular component.

4. The vehicle fairing structure according to claim 3, wherein the front vehicular component is a tractor cab having a front profile, and the area bounded by the distal edges of the horizontal and first and second vertical surfaces is inboard of the tractor cab front profile.

5. The vehicle fairing structure according to claim 1, wherein the distal edges bound an area positioned completely within a volume bounded by a shear layer formed in the gap when the vehicle is in motion.

6. The vehicle fairing structure according to claim 1, adapted to be positioned in the gap between a tractor and a trailer in a tractor-trailer combination, wherein the top and first and second side surfaces are curved so that the distal edges bound an area inboard of the top and sides of the trailer box and inboard of a profile made by the tractor cab, viewed head-on.

7. The vehicle fairing structure according to claim 1, further comprising horizontal and first and second vertical support walls having respective first edges joining the distal edges of the top and first and second side surfaces and opposed edges attaching to a surface of the vehicle.

8. A rear vehicular component for a vehicle having a front vehicular component and a rear vehicular component in tandem and separated by a gap, comprising:

a rear vehicular component;

a top fairing surface attached to the rear vehicular component;

a first side surface attached to a first side of the rear vehicular component, the first side surface being approximately equidistant in length to the first side of the rear vehicle component, and joining a first end of the top surface and generally perpendicular to the top surface;

a second side surface attached to a second side of the rear vehicular component, the second side surface being approximately equidistant in length to the second side of the rear vehicle component, and joining a second end of the top surface opposite the first end and generally perpendicular to the top surface;

each of the top and first and second side surfaces having a proximal edge adapted to be positioned adjacent a vehicle;

each of the top and first and second vertical surfaces having a distal edge positioned away from the rear vehicular component with respect to the respective proximal edge;

wherein an area bounded by the distal edges of the surfaces is smaller than an area bounded by the proximal edges;

wherein the proximal edges of the top and side surfaces attach to the leading top and side edges, respectively, of the front surface of the rear vehicle component, so that an uninterrupted surface is formed from the fairing structure to the top and sides of the rear vehicular component; and wherein the distal and proximal edges of the surfaces are positioned relative to each other such that when the rear vehicular component is operated in tandem with the front vehicular component, the fairing structure is positioned in the gap between said rear vehicular component and the front vehicular component and impedes outward transverse and vertical flow in the gap, thus creating a region of increased pressure which effectively fills and thereby closes the gap.

9. A tractor-trailer compound vehicle comprising a front tractor cab;

a rear trailer box, separated from the front tractor cab by a gap; and a fairing structure on the front end of the rear trailer, said fairing structure comprising a top surface having a proximal edge attached at a top front edge of the trailer box;

a first side surface joining a first end of the top surface and generally perpendicular to the top surface, the first side surface being approximately equidistant in length to the first side of the trailer box, and having a proximal edge attached at a first side front edge of the trailer box;

a second side surface joining a second end of the top surface opposite the first end and generally perpendicular to the top surface, the second side surface being approximately equidistant in length to the second side of the trailer box, and having a proximal edge attached at a second side front edge of the trailer box;

such that the fairing structure forms a continuous surface at the edge of the rear vehicular component and such that each of said top and first and second side surfaces having a respective distal edge opposite the proximal edges, wherein said distal edges are inboard of the top and sides of the trailer box, and positioned generally inside the volume bounded by the shear layer of the cab;

the distal and proximal edges of the surfaces are positioned relative to each other such that the fairing structure, when positioned adjacent the trailer box of the tractor-trailer compound vehicle in the gap between said trailer box and the front tractor cab impedes outward transverse and vertical flow in the gap, thus creating a region of increased pressure which effectively fills and thereby closes the gap.

10. A process for manufacturing a rear vehicle component of a vehicle having a front vehicular component and a rear vehicular component in tandem and separated by a gap, comprising:

positioning a top fairing surface adjacent to a forward upper end of the rear vehicle component;

positioning a proximal edge of a first side surface adjacent to a first side of the rear vehicular component, the first side surface the first side surface being approximately equidistant in length to the first side of the rear vehicle component, and joining a first end of the top surface and generally perpendicular to the top surface;

positioning a proximal edge of a second side surface adjacent to a second side of the rear vehicular component, the second side surface the second side surface being approximately equidistant in length to the second side of the rear vehicle component, and joining a second end of the top surface and being opposite the first end and generally perpendicular to the top surface;

each of the top and first and second vertical surfaces having a distal edge positioned away from the rear vehicle component with respect to the respective proximal edge;

wherein an area bounded by the distal edges of the surfaces is smaller than an area bounded by the proximal edges;

wherein the proximal edges of the top and side surfaces attach to the leading top and side edges, respectively, of the front surface of the rear vehicle component, so that an uninterrupted surface is formed from the fairing structure to the top and sides of the rear vehicular component; and wherein the distal and proximal edges of the surfaces are positioned relative to each other such that the fairing structure, during operation of the vehicle, impedes outward transverse and vertical flow in the gap between said rear vehicular component and the front vehicular component of the vehicle, thus creating a region of increased pressure which effectively fills and thereby closes the gap.

* * * * *